Patented Aug. 22, 1944

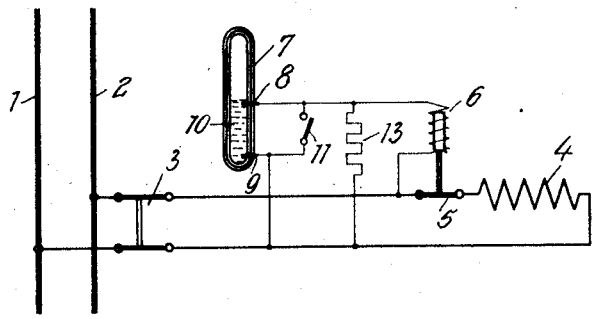
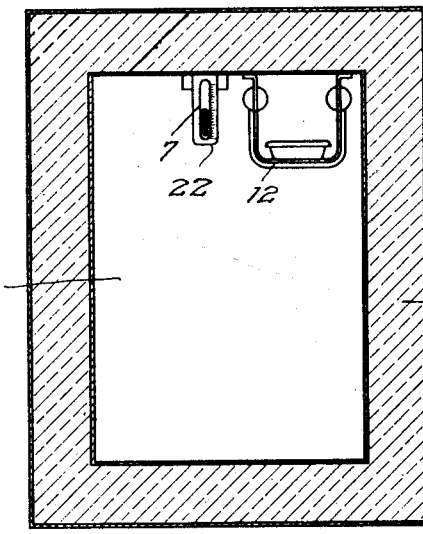
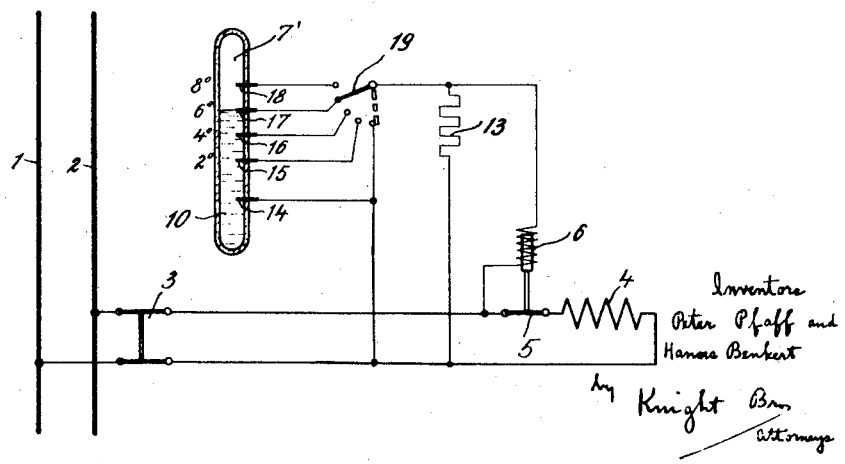

2,356,612

UNITED STATES PATENT OFFICE 2,356,612

TEMPERATURE-RESPONSIVE CONTROL MECHANISM, ESPECIALLY FOR REFRIGERATING APPARATUS

Peter Pfaff, Berlin-Siemensstadt, and Hanns Benkert, Berlin - Charlottenburg, Germany; vested in the Alien Property Custodian Application March 30, 1940, Serial No. 327,080
In Germany March 31, 1939

1 Claim. (Cl. 62—4)

The present invention relates to temperature-responsive control mechanism, especially for refrigerating apparatus.

For operating refrigerating apparatus in response to changes in temperature and for thus controlling the amount of energy supplied, for example, to the motor-compressor unit of a refrigerator, it has been customary to employ thermostatic devices consisting of a closed gas-filled container the contents of which is subjected to changes in temperature of a part of the refrigerating apparatus and hence to changes in pressure, thus effecting the respective control operations. These types of thermostatic devices, however, have the disadvantage of tending to leak and of then incorrectly controlling the temperature of the refrigerator.

For ensuring proper operation, these thermostats are usually mounted so that the heat-responsive elements thereof are in direct heat-exchanging contact with the evaporator of the refrigerating apparatus. This results in relatively large variations in temperature between the times of turning on and off the supply of energy to the apparatus. Such large temperature intervals are desirable from the viewpoint of a reliable control operation. However, such an arrangement of the thermostat requires additional adjusting means for controlling the apparatus also in accordance with the varying temperature of the outside atmosphere. These adjusting means are of relatively complicated design and increase the cost of the control mechanism of the refrigerator considerably.

It is the object of the present invention to provide a temperature-responsive control mechanism for refrigerating apparatus which overcomes the disadvantages of the prior art as described above and forms a simple, inexpensive means for accurately controlling the operation of household refrigerators.

A feature of the invention resides in a temperature-responsive control mechanism, especially for household refrigerators, which contains a contact thermometer for controlling the operation of a relay in accordance with the changes in temperature of a certain portion of the refrigerator, which relay, in turn, is used for switching on and off the supply of energy for operating the refrigerating apparatus.

A complementary feature of the invention is a device for disconnecting the contact thermometer or rendering the same inactive, and for connecting the control relay directly to the source of energy so that the refrigerating apparatus may be controlled either automatically in response to the operation of the contact thermometer to maintain a certain temperature in the cooling chamber, or manually by connecting the refrigerating apparatus continuously to the source of energy for freezing any kind of food products or obtaining ice cubes within a short time.

In its simplest form, the invention consists in a thermometer connected to a source of current and having a single fixed contact for controlling the operation of the relay in accordance with a certain temperature, and a simple switch connected to the thermometer for bridging, when in closed position, the contact thermometer to connect the control relay directly to the source of current. Since the cooling chamber of a refrigerator, and especially a household refrigerator, is usually maintained at a certain temperature determined by experience, for example +6° C., it is only necessary according to the invention to secure the single controlling contact at a point of the thermometer corresponding to such temperature. It has been found advisable to mount the thermometer so as to visibly indicate the temperature of the cooling chamber and not to be in direct heat-exchanging contact with the evaporator.

Further objects, features and advantages of the invention will appear from the following detailed description and the accompanying drawing, in which Fig. 1 is a diagrammatic showing of an embodiment of the invention, Fig. 2 discloses the manner of mounting the thermometer according to Fig. 1 within a refrigerator casing, and Fig. 3 is another diagrammatic showing of a modification of the invention.

As shown in the drawing, the invention may be applied to a refrigerator provided with a compressor driven by an electromotor. The current is supplied by the mains 1 and 2 through a main switch 3 to the winding 4 of the motor for driving the compressor (not shown). A control relay 5 having a winding 6 automatically opens or closes the circuit of the motor 4 in accordance with the temperature of a portion of the refrigerator. For this purpose, a thermometer 7 having a pair of fixed contacts 8 and 9 is provided in the circuit of the relay winding 6 in the manner shown in Fig. 1. Thus, as soon as the mercury column 10 of the thermometer 7 rises sufficiently to connect the contacts 8 and 9, the circuit of the relay winding 6 is closed so that, in turn, the contacts of the relay 5 are closed to start the motor 4. The contact 8 is preferably fixed at a point of the thermometer corresponding to the desired temperature of the cooling chamber of the refrigerator.

Although the cooling chamber of the refrigerator will generally be maintained automatically at a certain temperature by the controlling action of the contact thermometer, a manual control may sometimes be desirable for obtaining a higher or lower temperature for a limited time, for example, for freezing food products or for obtaining ice cubes within a short time. For this purpose, the invention provides a manually operated switch 11 which, when in closed position, bridges the contacts 8 and 9 of the thermometer so that the motor 4 is driven continuously until the switch is opened, whence the refrigerator is again controlled automatically by the contact thermometer 7.

As indicated in Fig. 2, the contact thermometer 7 is preferably mounted in the cooling chamber 20 of the refrigerator, for example, on the rear inner wall of the refrigerator cabinet 21, so as to indicate the temperature of the air therein. It may be provided with a temperature scale 22 facing the door of the refrigerator, thus permitting a reading of the temperature of the cooling chamber regardless of whether the switch 11 is opened or closed. It may also be desirable to operate the contact thermometer 7 and the relay 6 with a current lower than that supplied by the mains 1 and 2. This may be easily achieved by providing a resistance 13 in the manner shown in Fig. 1 and of a size corresponding to the resistance of the relay winding 6.

In order to render the automatic controlling action of the contact thermometer adjustable to permit different predetermined temperatures to be maintained at different times in the cooling chamber of the refrigerator, the thermometer is preferably provided with two or more controlling contacts and a switch or the like for selecting one or another contact, or for disconnecting the thermometer entirely from the relay circuit if the refrigerator is to operate continuously, as described relative to Fig. 1.

An embodiment of this type is exemplified in Fig. 3. The contact thermometer 7' is provided with five stationary contacts 14 to 18, the contact 14 forming the lead-in contact and contacts 15, 16, 17 and 18 the temperature-controlling contacts corresponding, for example, to the temperatures of 2°, 4°, 6° and 8° C., respectively. The contacts 15 to 18 are connected to the corresponding contacts of a single manually operated switch 19, the fifth contact of which is connected to the lead-in contact 14 of the thermometer.

The operation of the device is similar to that described relative to Fig. 1. If the switch 19 is placed, for example, in the position indicated in Fig. 3, the cooling chamber is automatically maintained at a temperature of 6° C. As soon as the mercury column 10 connects the lead-in contact 14 with the control contact 17, the circuit of the relay 6 is closed causing a closing of the relay contacts 5 so that the motor 4 starts to operate. For quick-freezing purposes, the switch 19 is placed in the position shown in dotted lines, thus bridging the control contacts 15 to 18 and maintaining the relay 6 continuously energized.

Although the invention has been described with particular reference to refrigerators operated by a motor-compressor unit, obviously it may also be applied to other types of refrigerators and especially those operated by continuous absorption in which case the winding 4 is substituted by a heating coil or the like.

We claim:

Structure for controlling the temperature in the cooling chamber of a refrigerating apparatus having an electrically actuated cold producing device, comprising current supply means for energizing said device, a relay for controlling the flow of current from said current supply means to said device, a thermometer disposed in said cooling chamber and having a plurality of control contacts corresponding to different degrees of temperature, a manually-adjustable selective switch disposed separate from said thermometer and interposed between said thermometer and said relay, said switch having a plurality of contacts connected to the corresponding contacts of said thermometer for selectively connecting said contacts to said relay so as to operate the latter in accordance with a selected temperature, said switch having another contact connected with said current supply means for energizing, when selected, said device independently of said thermometer.

PETER PFAFF.
HANNS BENKERT.